United States Patent [19]

Temple et al.

[11] Patent Number: 5,172,793

[45] Date of Patent: Dec. 22, 1992

[54] VEHICLE BRAKE WITH BRAKE CYLINDER BORE INSERT

[75] Inventors: Robert B. Temple, Granger, Ind.; Edgar A. Behrmann, Mason City, Iowa; Donald D. Johannesen, South Bend, Ind.

[73] Assignee: Allied-Signal Inc., Morristown, N.J.

[21] Appl. No.: 541,680

[22] Filed: Jun. 21, 1990

[51] Int. Cl.$^5$ .................... F16D 55/19; F16F 9/36; F16J 10/04

[52] U.S. Cl. .................. 188/72.4; 188/322.18; 277/212 FB; 277/208; 92/170.1

[58] Field of Search ........... 188/72.4, 72.5, 73.1, 188/151 R, 322.18, 368, 369, 370, 382; 277/212 FB, 208, 37, 136, 137, 200, 168, 9; 92/168 R, 169.1, 170.1, 171.1

[56] References Cited

U.S. PATENT DOCUMENTS

| Re. 30,223 | 3/1980  | Prescott et al. ........... 277/37     |
|------------|---------|----------------------------------------|
| 1,031,323  | 7/1912  | Christensen .............. 92/170.1    |
| 2,132,978  | 10/1938 | Stewart ................... 92/170.1   |
| 2,180,795  | 11/1939 | Christensen ............ 92/170.1 X    |
| 2,794,521  | 6/1957  | Morrison ................. 188/369 X   |
| 3,403,917  | 10/1968 | MacSpadden, Jr. .......... 277/200     |
| 3,511,137  | 5/1970  | Smith ..................... 92/171.1   |
| 3,995,723  | 12/1976 | Holcomb, Jr. ............. 188/72.4    |
| 4,006,669  | 2/1977  | Price ................... 188/72.4 X   |
| 4,053,030  | 11/1977 | Bainard et al. ........... 188/71.8    |
| 4,194,750  | 3/1980  | Soyish et al. ............ 277/208     |
| 4,570,531  | 2/1986  | Anderson et al. ....... 188/72.4 X     |
| 4,678,064  | 7/1987  | Adache et al. ....... 277/212 FB X     |
| 4,809,821  | 3/1989  | Fulmer ................. 188/370 X     |
| 4,856,794  | 8/1989  | Boyers et al. ........... 277/208 X    |
| 4,928,577  | 5/1990  | Stoll .................... 277/208 X   |
| 4,930,791  | 6/1990  | Ungchusri et al. ......... 277/208 X   |

FOREIGN PATENT DOCUMENTS

| 2337910 | 2/1975 | Fed. Rep. of Germany . |
| 2738657 | 3/1979 | Fed. Rep. of Germany ...... 188/370 |
| 2429917 | 1/1980 | France . |
| 2070732 | 9/1981 | United Kingdom ............... 92/171.1 |

Primary Examiner—Robert J. Oberleitner
Assistant Examiner—Josie A. Ballato
Attorney, Agent, or Firm—Larry J. Palguta; Ken C. Decker

[57] ABSTRACT

The vehicle brake with brake cylinder bore insert (30, 130) comprises a cast disc brake cylinder (12, 112) which includes a bore (14, 114) into which the bore insert (30, 130) may be disposed. The bore (14, 114) may have an opening (22, 118) at either one (20, 120) of the opposite axial ends for inserting the bore insert (30, 130). The insert has lock ribs (34) disposed about the perimeter (32) thereof, and at opposite axial ends a pair of perimeter extensions or crush ribs (36) which tightly engage the surface (21, 121) of the bore (14, 114) when the insert (30, 130) is disposed within the bore (14, 114). The insert (30, 130) has opposite flat sides (50) which permit an adhesive material to be disposed between the lock ribs (34) and the surface (21, 121) of the bore (14) in order to fix the insert (30) within the bore (14). The insert (30, 130) contains a central opening (39, 139) which may be of different diameters or shapes for receiving a piston (40) and seals disposed about the piston (40).

10 Claims, 2 Drawing Sheets

VEHICLE BRAKE WITH BRAKE CYLINDER BORE INSERT

The present invention relates generally to a brake cylinder having a bore insert, and in particular to a disc brake having a bore insert with variable size piston openings.

Disc brake cylinders are typically made from castings that must be machined in order to receive other component parts. The bore of the cylinder must be machined so that it will receive slidably the piston, and so that one or more grooves therein will house a seal that sealingly engages the surface of the piston and house a boot seal which extends between the bore and piston in order to keep contaminants out of the bore. This machining requires manufacturing time and increases the cost of the brake. Additionally, different size brakes require different castings in order to accommodate the different diameter pistons. It is highly desirable to eliminate the machining typically required for a disc brake cylinder, and particularly for a cylinder housed in the caliper of the brake, and it would be extremely advantageous to provide a disc brake cylinder which would serve as a common cylinder for various size pistons. The elimination of machining would greatly reduce the cost and complexity of providing the caliper housing, and the provision of a common cast cylinder for various size brakes would also greatly reduce manufacturing time and cost.

The present invention solves the above problems by providing a vehicle brake with a brake cylinder having a bore insert, comprising a brake cylinder having an interior cavity comprising a bore for receiving therein a bore insert, brake fluid, and piston means, the bore communicating with at least one opening in the cylinder for receiving the brake fluid and a large opening receiving said piston means, the bore insert comprising a member having an outer perimeter with perimeter extensions extending beyond the outer perimeter at opposite axial ends of the bore insert, and a central opening therein, the bore insert disposed within the bore such that the perimeter extensions are tightly engaged by the surface of the bore, and the piston means received slidably within the central opening of the bore insert.

The present invention is described in detail below with reference to the drawings which illustrate embodiments in which.

Figure 1:
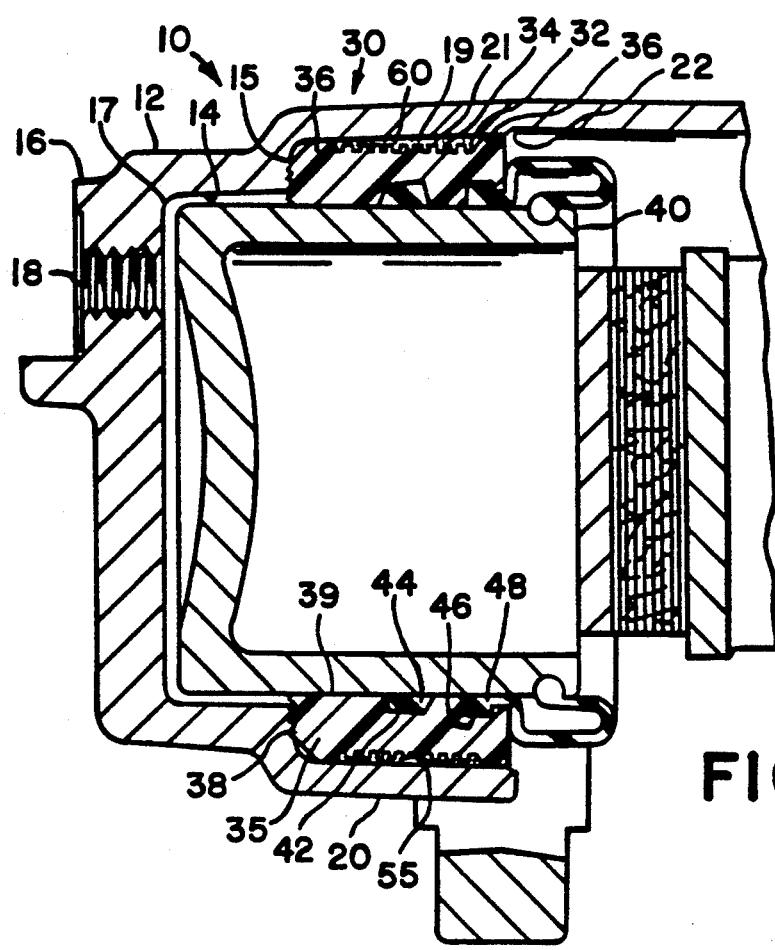
FIG. 1 is an illustration of a disc brake cylinder having a bore insert.

A brake cylinder having the bore insert of the present invention is illustrated in FIG. 1. Brake cylinder 10 comprises a cast cylinder 12 which defines an interior opening or stepped cylinder bore 14. One end 16 of cylinder 12 includes an opening 18 for receiving brake fluid. The opposite end 20 of cylinder 12 includes a large or end opening 22 for receiving a bore insert indicated generally by reference numeral 30, and a piston 40. Stepped cylinder bore 14 includes a shoulder 15 between a reduced diameter section 17 and a large diameter section 19. Cylinder 12 may be cast in just one standard size for all sizes of disc brake constructions, because insert 30 may have various size openings therein in order to accommodate different size pistons 40. Insert 30 comprises a generally annular, nonannular, or noncircular member, depending on the shape of the large diameter section 19, and includes an outer perimeter 32 having lock ribs 34 thereabout. Insert 30 further includes at opposite axial ends perimeter extensions or crush ribs 36 which are slightly larger than opening 22 of the large diameter section 19 so as to effect a tight interference fit therebetween. Axial end 35 of bore insert 30 includes thereabout axial crush rings 38 for engagement with bore shoulder 15. Bore insert 30 includes a central opening 39 which includes therein a groove 42 for receiving a typical piston seal 44 and an outer groove 46 for receiving one end of a typical boot seal 48 or a wiper type seal which extends between bore insert 30 and piston 40. Piston 40 may be a metallic or phenolic piston which slidably engages central opening 39, whereby piston seal 44 prevents brake fluid from escaping from stepped cylinder bore 14.

Figure 2:
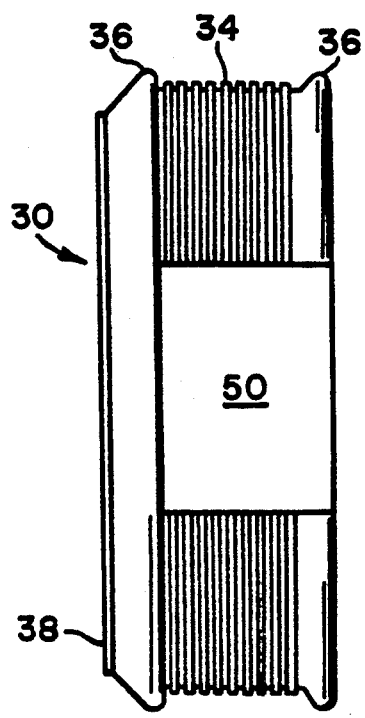
FIG. 2 is a side view of the bore insert of FIG. 1.
Figure 3:
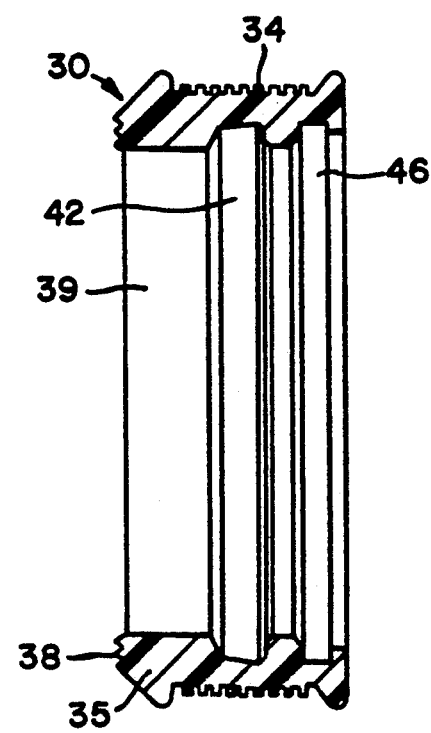
FIG. 3 is a section view of the bore insert of FIG. 2.
Figure 4:
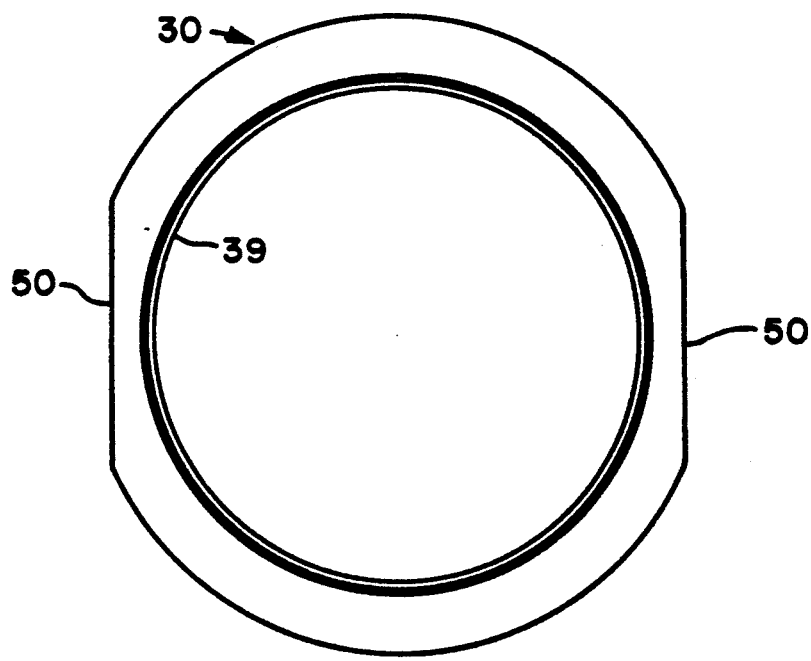
FIG. 4 is an end view of the bore insert.

Bore insert 30 includes opposite flat sides 50 (see FIGS. 2 and 4) which enable insert 30 to be fixedly attached in cylindrical stepped cylinder bore 14 such that pressurized brake fluid will not force insert 30 from cylinder bore 14. An adhesive material such as an epoxy 55 would be inserted (from the right side of the insert in FIG. 2) between flat sides 50 (see FIG. 4) and surface 21 of large diameter section 19 so that the adhesive material enters area 60 disposed between lock ribs 34 and surface 21. The adhesive would, via the lock ribs and the natural as-cast rough surface of large diameter section 19, adhere bore insert 30 to bore 14.

Bore insert 30 could be provided by a number of materials. Such materials could comprise injection molded high performance thermo plastics such as a liquid crystal polymer exemplified by Amoco's XYDAR® and polyphenylenesulfide ("PPS") exemplified by General Electric's SUDEC 401 an Phillips RYTON 4, as well as Allied Chemical products such as Phenolic-Triazine copolymer thermoset plastics. Also, compression molded phenolic composites such as DAREZ 29502, cast or molded ceramics, or injection molded rubbers could be used.

A disc brake with the bore insert of the present invention is provided by inserting an appropriately sized bore insert within the cylinder bore 14 to effect a press fit between crush ribs 36 and large diameter section 19, and a similar fit between axial crush rings 38 and shoulder 15. Then the adhesive material is inserted into area 60 between the large diameter section 19 of cylinder bore 14 and the flat sides 50 of bore insert 30 so that the adhesive material fixedly adheres the bore insert within cylinder bore 14. This would provide a strong mechanical lock between bore insert 30 and cylinder 12. If necessary, more prominent or radially extending features could be cast on surface 21 of the cylinder bore 14 in order to provide a stronger lock via the adhesive material.

Figure 5:
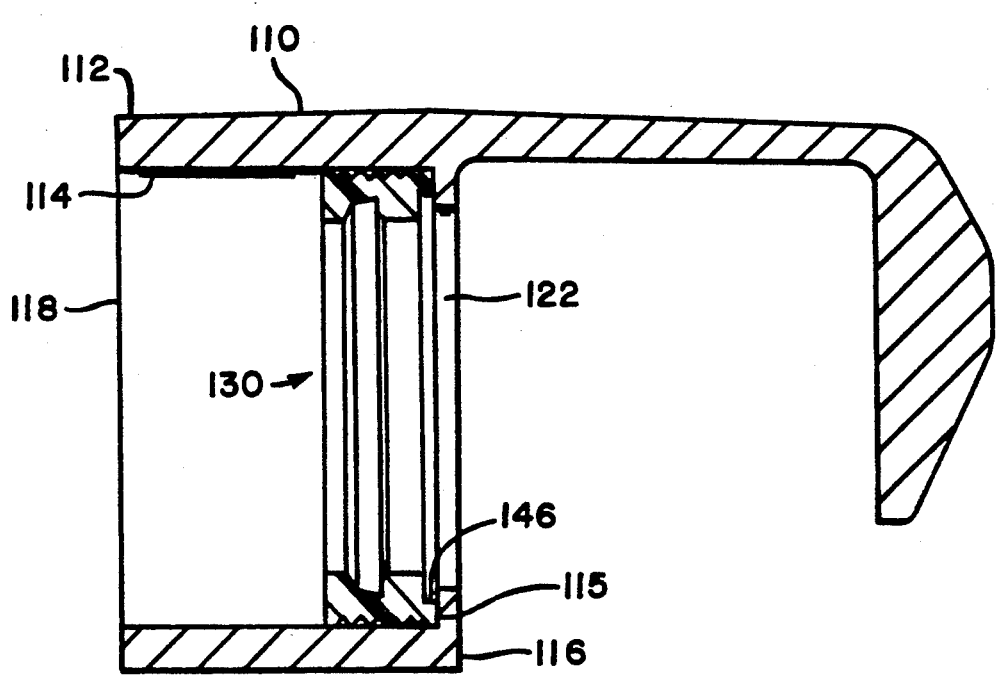
FIG. 5 is an alternative embodiment of a disc brake caliper housing having a bore insert of the present invention.

FIG. 5 illustrates an alternative embodiment of the present invention wherein a disc brake caliper housing 110 comprises a brake cylinder 112 having a cylinder bore 114 with an axial opening 122 disposed oppositely from an axial opening 118. Opening 118 would be closed by another member fixed to that end of housing 110. A bore insert 130, which is similar to the insert in the previous embodiment, would be inserted via opening 118 and abut the bore shoulder 115 which defines axial opening 122 at end 116. This embodiment of the invention would ensure that the bore insert could not be forced from cylinder bore 114 by pressurized brake fluid. Adhesive material could be utilized to retain bore insert 130 at its position adjacent opening 122 and to provide a hydraulic seal between the insert and housing. Shoulder 115 would define with groove 146 an outer retention groove for one end of a flexible boot seal (not shown).

We claim:

1. A vehicle brake cylinder having a stationary bore insert, comprising an interior cavity of the brake cylinder being a cylinder bore with a surface and receiving therein the bore insert, brake fluid, and piston means, the cylinder bore communicating with at least one opening in the cylinder for receiving the brake fluid and an end opening receiving said piston means, the stationary bore insert comprising an integral member with a continuous outer perimeter having perimeter extensions extending radially beyond the outer perimeter at opposite axial ends of the insert, groove means receiving seal means disposed between the bore insert and piston means, and a central opening therein defining an insert bore, the bore insert disposed within the cylinder bore such that the perimeter extensions are tightly engaged and deformed by the surface of the cylinder bore, and the piston means received in and engaging slidably only the seal means and insert bore of the bore insert.

2. The brake cylinder in accordance with claim 1, wherein the insert further comprises a plurality of insert ribs disposed about a portion of the perimeter thereof.

3. The brake cylinder in accordance with claim 2, wherein the bore insert comprises oppositely disposed flat, axially extending side portions.

4. The brake cylinder in accordance with claim 3, wherein adhesive means is disposed between the surface of the cylinder bore and the flat, axially extending side portions of the bore insert such that the adhesive means is between said insert ribs and cylinder bore in order to fix tightly the bore insert in engagement with the cylinder bore.

5. The brake cylinder in accordance with claim 1, wherein one axial end of the insert comprises crush rings integral therewith, and the cylinder bore comprises a stepped bore having a shoulder which is engaged by said crush rings.

6. The brake cylinder in accordance with claim 1, wherein the perimeter extensions of the bore insert comprise crush ribs.

7. The brake cylinder in accordance with claim 6, wherein the brake cylinder is part of a disc brake.

8. The brake cylinder in accordance with claim 1, wherein the groove means further comprises an axially outer groove adjacent the central opening and which receives a portion of a boot seal of the seal means, the boot seal disposed between the bore inset and piston means.

9. The brake cylinder in accordance with claim 1, wherein the cylinder bore comprises a reduced diameter portion providing a shoulder of the cylinder bore and defining said end opening through which the piston means extends, the bore insert abutting said shoulder.

10. The brake cylinder in accordance with claim 1, wherein the cylinder bore includes at one end opposite the end opening an opening through which said bore insert is inserted and positioned within the cylinder bore.

* * * * *